United States Patent
Iwata et al.

(10) Patent No.: US 10,584,194 B2
(45) Date of Patent: Mar. 10, 2020

(54) ACTIVE ENERGY RAY CURABLE LIQUID COMPOSITION, METHOD FOR MANUFACTURING THREE-DIMENSIONAL OBJECTS, AND APPARATUS FOR MANUFACTURING THREE-DIMENSIONAL OBJECTS

(71) Applicants: Hiroshi Iwata, Aichi (JP); Yoshihiro Norikane, Kanagawa (JP); Tatsuya Niimi, Kanagawa (JP); Takashi Matsumura, Kanagawa (JP); Hiroyuki Naito, Tokyo (JP)

(72) Inventors: Hiroshi Iwata, Aichi (JP); Yoshihiro Norikane, Kanagawa (JP); Tatsuya Niimi, Kanagawa (JP); Takashi Matsumura, Kanagawa (JP); Hiroyuki Naito, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 246 days.

(21) Appl. No.: 15/629,955

(22) Filed: Jun. 22, 2017

(65) Prior Publication Data

US 2017/0369607 A1  Dec. 28, 2017

(30) Foreign Application Priority Data

Jun. 28, 2016  (JP) ................................. 2016-127361

(51) Int. Cl.
| | | |
|---|---|---|
| *C08F 2/50* | (2006.01) | |
| *C08F 2/48* | (2006.01) | |
| *C08G 61/04* | (2006.01) | |
| *C08F 20/16* | (2006.01) | |
| *C09D 11/101* | (2014.01) | |
| *C09D 11/30* | (2014.01) | |
| *B29C 64/112* | (2017.01) | |
| *C08J 3/075* | (2006.01) | |

(52) U.S. Cl.
CPC ............ *C08F 20/16* (2013.01); *B29C 64/112* (2017.08); *C08J 3/075* (2013.01); *C09D 11/101* (2013.01); *C09D 11/30* (2013.01); *C08F 2800/20* (2013.01); *C08J 2333/08* (2013.01)

(58) Field of Classification Search
CPC ..... C08F 20/16; C08F 2800/20; C08J 3/0754; C08J 2333/08

USPC .................................................. 522/1; 520/1
See application file for complete search history.

(56) References Cited

U.S. PATENT DOCUMENTS

| | | |
|---|---|---|
| 2005/0053798 A1 | 3/2005 | Maekawa et al. |
| 2010/0288194 A1 | 11/2010 | Stockwell et al. |
| 2013/0234370 A1 | 9/2013 | Suzuki et al. |
| 2016/0115297 A1 | 4/2016 | Norikane et al. |
| 2016/0244628 A1 | 8/2016 | Breton et al. |
| 2016/0263826 A1 | 9/2016 | Suzuki et al. |
| 2016/0264796 A1 | 9/2016 | Suzuki et al. |
| 2016/0275818 A1 | 9/2016 | Norikane et al. |
| 2017/0008228 A1 | 1/2017 | Iwata et al. |
| 2017/0022348 A1 | 1/2017 | Iwata et al. |
| 2017/0210922 A1 | 7/2017 | Breton et al. |

FOREIGN PATENT DOCUMENTS

| | | | |
|---|---|---|---|
| AT | 412 399 B | 2/2005 | |
| AT | 412399 | * 2/2005 | |
| DE | 10 2016 201 716 A1 | 8/2016 | |
| EP | 2 636 511 A1 | 9/2013 | |
| EP | 2636511 A1 | * 9/2013 | ............ C08F 220/10 |
| JP | 2003-535712 | 12/2003 | |
| JP | 2005-081563 | 3/2005 | |
| JP | 2012-111226 | 6/2012 | |
| JP | 2013-043409 | 3/2013 | |
| JP | 2015-136895 | 7/2015 | |
| JP | 2015-232080 | 12/2015 | |
| WO | WO00/052624 A1 | 9/2000 | |

OTHER PUBLICATIONS

Schwager et al, AT 412 399 Machine Translation, Feb. 25, 2005 (Year: 2005).*
Extended European Search Report dated Nov. 3, 2017 in Patent Application No. 17174844.5, 8 pages.
U.S. Appl. No. 15/113,609, filed Jul. 22, 2016.

* cited by examiner

*Primary Examiner* — Jessica Whiteley
(74) *Attorney, Agent, or Firm* — Oblon, McClelland, Maier & Neustadt, L.L.P.

(57) ABSTRACT

An active energy ray liquid composition is provided. A cured product of the active energy ray curable liquid composition is a solid at 25° C. and a liquid at 60° C., and the solid exhibits a compression stress of 2.0 kPa or more when compressed 1%.

12 Claims, 2 Drawing Sheets

ACTIVE ENERGY RAY CURABLE LIQUID COMPOSITION, METHOD FOR MANUFACTURING THREE-DIMENSIONAL OBJECTS, AND APPARATUS FOR MANUFACTURING THREE-DIMENSIONAL OBJECTS

CROSS-REFERENCE TO RELATED APPLICATIONS

This patent application is based on and claims priority pursuant to 35 U.S.C. § 119(a) to Japanese Patent Application No. 2016-127361, filed on Jun. 28, 2016 in the Japan Patent Office, the entire disclosure of which is hereby incorporated by reference herein.

BACKGROUND

Technical Field

The present disclosure relates to an active energy ray curable liquid composition, a method for manufacturing three-dimensional objects, and an apparatus for manufacturing three-dimensional objects.

Description of the Related Art

Additive manufacturing is known as one technology for creating three-dimensional objects. In additive manufacturing, a three-dimensional model of the object to be created is sliced into thin layer models, the cross-sectional shape of each layer model is calculated, and layers of a molding material are laminated based on the calculated shapes of the thin layer models. Other examples including fused deposition molding, ink jetting, binder jetting, stereo lithography, and selective laser sintering are also known as technologies for creating three-dimensional objects. Specifically, the material jetting that has been proposed recently involves jetting a light curable resin in a liquid state, curing the liquid resin into a layer, and laminating the layers to create a three-dimensional object.

Material jetting, more specifically, ink jetting, however, in principle has difficulty in creating a three-dimensional object having a complicated shape (such as an overhang shape). In such cases, generally, a support structure for supporting a molding material is simultaneously created in the process of creating an object from the molding material.

SUMMARY

In accordance with some embodiments of the present invention, an active energy ray liquid composition is provided. A cured product of the active energy ray curable liquid composition is a solid at 25° C. and a liquid at 60° C., and the solid exhibits a compression stress of 2.0 kPa or more when compressed 1%.

In accordance with some embodiments of the present invention, another active energy ray liquid composition is provided. The active energy ray curable liquid composition comprises a monofunctional ethylenic unsaturated monomer (A) having a straight chain including 14 or more carbon atoms, a polymerization initiator (B), and a solvent (C) capable of dissolving the monomer (A). A cured product of the active energy ray curable liquid composition is a solid at 25° C. and a liquid and 60° C.

In accordance with some embodiments of the present invention, another active energy ray liquid composition is provided. The active energy ray curable liquid composition exhibits a viscosity of 300 mPa·s or less at 25° C. A cured product of the active energy ray curable liquid composition is a solid exhibiting a compression stress of 0.5 kPa or more when being compressed 1% at 25° C. and a liquid exhibiting a viscosity of 5,000 mPa·s or less at 60° C.

In accordance with some embodiments of the present invention, a method for manufacturing three-dimensional objects is provided. The method includes the process of laminating a cured product of one of the above active energy ray curable liquid compositions.

In accordance with some embodiments of the present invention, another method for manufacturing three-dimensional objects is provided. The method includes the processes of creating a support structure by laminating a cured product of one of the above active energy ray curable liquid compositions and removing the support structure by application of heat.

In accordance with some embodiments of the present invention, an apparatus for manufacturing three-dimensional objects is provided. The apparatus includes a container storing one of the above active energy ray curable liquid compositions, an ejection device to eject the active energy ray curable liquid composition, and a curing device to cure the active energy ray curable liquid composition ejected by the ejection device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
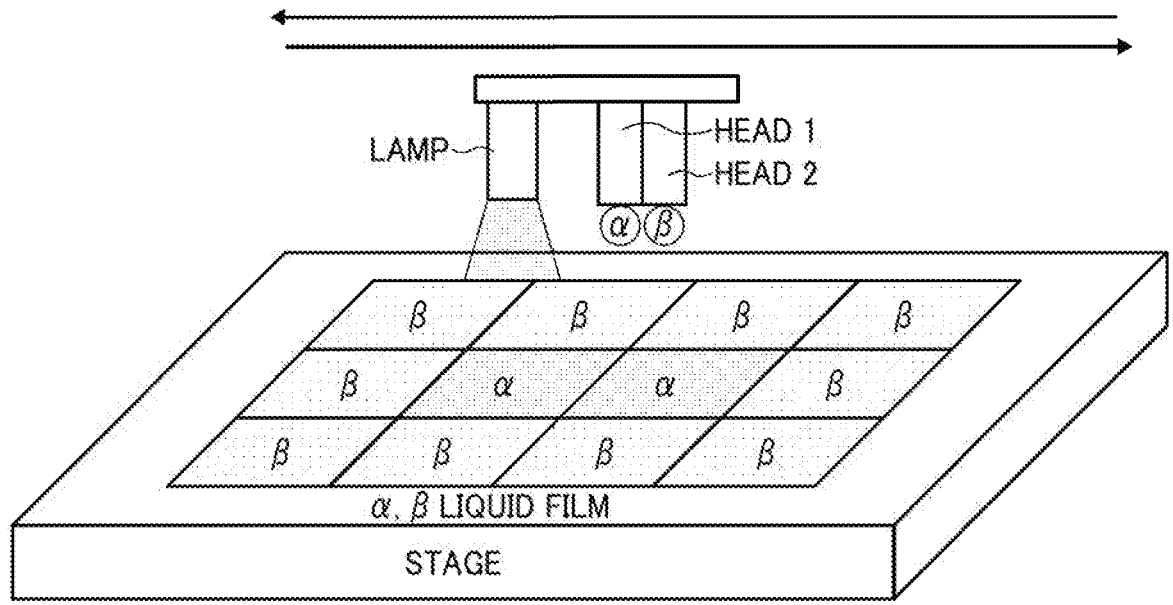
FIG. 1 is a schematic view illustrating a liquid film formed by an apparatus for manufacturing three-dimensional objects according to an embodiment of the present disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In the present disclosure, "support structure" refers to a solid part for supporting a molding material that forms (becomes) a target three-dimensional object, during creation of the object. The active energy ray curable liquid composition that forms (becomes) the support structure may be hereinafter referred to as "support material".

In a case in which the support structure is water-soluble, support is insufficient when the molding material is water-based. Such an insufficiency in support causes a significant problem particularly in a large-size apparatus for manufacturing large-size three-dimensional objects. When the support structure is dissolved by water, the water dissolving the support structure must be treated as industrial waste, which is a problematic situation.

In a case in which the support structure is formed of wax, molding accuracy may be unreliable because the wax can bend by contraction. Furthermore, the whole ejection apparatus body, including inkjet heads and ink flow channels, should remain heated so that the wax can be ejected in a liquid state.

One object of the present disclosure is to provide an active energy ray curable liquid composition, a cured product of which provides excellent support and removability when used in three-dimensional object-creating technologies. Another object of the present disclosure is to provide an active energy ray curable liquid composition that is easy to handle at normal temperature and a cured product thereof is excellent in molding accuracy and easily removable by heat.

In accordance with some embodiments of the present disclosure, an active energy ray curable liquid composition is provided, a cured product of which provides excellent support and removability when used in three-dimensional object-creating technologies. In accordance with some embodiments of the present disclosure, an active energy ray curable liquid composition is provided that is easy to handle at normal temperature and a cured product thereof has excellent molding accuracy and is easily removable by heat.

Active Energy Ray Curable Liquid Composition

The active energy ray curable liquid composition according to an embodiment of the present disclosure is a composition that is in a liquid state at 25° C. and curable by irradiation of an active energy ray (e.g., ultraviolet ray). A cured product of the active energy ray curable liquid composition is solid at 25° C. and liquid at 60° C. Preferably, the active energy ray curable liquid composition includes a monofunctional ethylenic unsaturated monomer (A) having a straight chain including 14 or more carbon atoms, a polymerization initiator (B), and a solvent (C) capable of dissolving the monomer (A).

Monofunctional Ethylenic Unsaturated Monomer (A) Having Straight Chain Including 14 or More Carbon Atoms Specific examples of the monofunctional ethylenic unsaturated monomer (A) having a straight chain including 14 or more carbon atoms include the materials listed below, but are not limited thereto.

Acrylates (e.g., stearyl acrylate, docosyl acrylate)

Methacrylates (e.g., stearyl methacrylate, docosyl methacrylate)

Acrylamides (e.g., palmityl acrylamide, stearyl acrylamide)

Vinyl compounds (e.g., vinyl stearate, vinyl docosanoate)

Each of the above materials can be used alone or in combination with others. From the aspect of photoreactivity, acrylates and acrylamides are preferable. From the aspect of solvent solubility, stearyl acrylate is preferable.

Monomers capable of performing radical polymerization, ion polymerization, coordination polymerization, or ring-opening polymerization may be used. In view of reaction controllability, monomers capable of performing radical polymerization are preferable. Thus, ethylenic unsaturated monomers having hydrogen bonding ability are preferable. In particular, monofunctional ethylenic unsaturated monomers are preferable from the aspect of melting property.

Polymerization Initiator (B)

Examples of the polymerization initiator (B) include, but are not limited to, thermal photopolymerization initiators and photopolymerization initiators. In creating three-dimensional objects, photopolymerization initiators are preferably used.

Examples of the photopolymerization initiators include, but are not limited to, materials capable of generating radicals by irradiation of light (in particular, ultraviolet ray having a wavelength of from 220 to 400 nm).

Specific examples of such materials include, but are not limited to, acetophenone, 2,2-diethoxyacetophenone, p-dimethylaminoacetophenone, benzophenone, 2-chlorobenzophenone, p,p'-dichlorobenzophenone, p,p-bisdiethylaminobenzophenone, Michler's ketone, benzyl, benzoin, benzoin methyl ether, benzoin ethyl ether, benzoin isopropyl ether, benzoin n-propyl ether, benzoin isobutyl ether, benzoin n-butyl ether, benzyl methyl ketal, thioxanthone, 2-chlorothioxanthone, 2-hydroxy-2-methyl-1-phenyl-1-one, 1-(4-isopropylphenyl)-2-hydroxy-2-methylpropane-1-one, methyl benzoylformate, 1-hydroxycyclohexyl phenyl ketone, azobisisobutyronitrile, benzoyl peroxide, and di-tert-butyl peroxide. Each of these materials can be used alone or in combination with others. Preferably, the type of photopolymerization initiator to be used is selected based on the wavelength of ultraviolet ray emitted from an ultraviolet emitter.

Solvent (C) Capable of Dissolving Monomer (A)

The solvent (C) is not limited to any particular material so long as it is capable of dissolving the monomer (A). Preferably, the solvent (C) has a straight chain including 6 or more carbon atoms so as not so significantly decrease crystallinity of polymer side chains. Specific examples of the solvent (C) include, but are not limited to, esters such as hexyl acetate and octyl acetate, and alcohols such as hexanol, decanol, and dodecanol.

Preferably, the monofunctional ethylenic unsaturated monomer (A) having a straight chain including 14 or more carbon atoms accounts for 20% to 70% by mass, more preferably 30% to 60% by mass, of the active energy ray curable liquid composition.

Preferably, the polymerization initiator (B) accounts for 0.5% to 10% by mass, more preferably 3% to 6% by mass, of the active energy ray curable liquid composition.

Preferably, a cured product of the active energy ray curable liquid composition is obtained by irradiating the active energy ray curable liquid composition with 200 mJ/cm$^2$ or more of ultraviolet ray emitted from an ultraviolet emitter.

Ultraviolet Emitter

Specific examples of the ultraviolet emitter ("UV emitter") include, but are not limited to, high-pressure mercury lamps, super high-pressure mercury lamps, and metal halide lamps.

A high-pressure mercury lamp is a point light source. A deep-UV-type high-pressure mercury lamp, combined with an optical system for improving light use efficiency, is capable of emitting ultraviolet rays in a short wavelength range.

Metal halide lamps are useful for colored materials since the emission wavelength range is wide. The type of metal (e.g., Pb, Sn, Fe) in the metal halide can be selected depending on the absorption spectrum of the photopolymerization initiator in use. In addition, commercially available ultraviolet ray emitters, such UV systems equipped with H bulb, D bulb, or V bulb, products of Fusion UV Systems Japan, may also be used.

As the monomer (A) incorporates the polymerization initiator (B) and is irradiated with ultraviolet ray, a polymer is produced while incorporating the solvent (C) therein. The polymer is in a solid state at a temperature of 25° C. due to the arrangement of carbon chains. The solvent (C) held in the polymer effectively inhibits the polymer from contracting or bending that may be caused when crystallization occurs. Preferably, the solvent (C) has a straight chain including 6 or more carbon atoms, in view of curability.

Preferably, the solvent (C) capable of dissolving the monomer (A) is a compound that is non-reactive with the polymerization initiator (B).

In the present disclosure, the solvent (C) capable of dissolving the monomer (A) refers to a solvent capable of becoming a homogeneous liquid when dissolving the monomer (A).

In the present disclosure, a non-reactive compound refers to a compound that remains chemically non-reactive even when irradiated with ultraviolet rays.

When the solvent (C) is a non-reactive compound, the solvent (C) does not chemically react with the polymerization initiator (B). Thus, polymerization of the monomer (A) and crystallization of the polymer side chains are not inhibited, which is preferable.

Preferably, the active energy ray curable liquid composition has a surface tension ranging from 20 to 45 mN/m, more preferably from 25 to 34 mN/m, at 25° C., but the surface tension is not limited thereto.

When the surface tension is 20 mN/m or more, the active energy ray curable liquid composition can be reliably ejected from nozzles without causing curved ejection or defective ejection during creation of the object. When the surface tension is 45 mN/m or less, the nozzles can be completely filled with the active energy ray curable liquid composition.

The surface tension can be measured with a surface tensiometer (e.g., a contact angle meter DROP MASTER DM-701 available from Kyowa Interface Science Co., Ltd.)

Viscosity

Preferably, the active energy ray curable liquid composition exhibits a viscosity of 300 mPa·s or less, more preferably 100 mPa·s or less, much more preferably from 3 to 20 mPa·s, and most preferably from 6 to 12 mPa·s, at 25° C.

When the viscosity is in excess of 300 mPa·s, the active energy ray curable liquid composition may not be ejected even when the ejection head is heated.

The viscosity can be measured with a rotary viscometer (e.g., VISCOMATE VM-150III available from Toki Sangyo Co., Ltd.) at 25° C.

Rate of Change of Viscosity

Before and after the active energy ray curable liquid composition is left to stand at 50° C. for 2 weeks, preferably, the rate of change of viscosity of the active energy ray curable liquid composition becomes 20% or less, more preferably 10% or less.

When the rate of change of viscosity is 20% or less, storage stability is proper and ejection stability is excellent.

The rate of change of viscosity, before and after the active energy ray curable liquid composition is left to stand at 50° C. for 2 weeks, can be measured as follows.

The active energy ray curable liquid composition is put in a 50-mL wide-mouthed polypropylene bottle and left to stand in a thermostatic chamber at 50° C. for 2 weeks. After taken out of the thermostatic chamber, the active energy ray curable liquid composition is left to stand until the temperature reaches room temperature (25° C.) and thereafter subjected to a measurement of viscosity. The rate of change of viscosity (RCV) is calculated from the following formula, where Vb and Va represent viscosities of the active energy ray curable liquid composition before and after being stored in the thermostatic chamber, respectively. The viscosities Vb and Va can be measured with an R-type viscometer (available from Toki Sangyo Co., Ltd.) at 25° C.

$$RCV\ (\%) = (Vb - Va)/Vb \times 100$$

Other Constituents

The active energy ray curable liquid composition may further include other constituents, such as a polymerization inhibitor, a mineral dispersible in the active energy ray curable liquid composition, a polymerizable monomer, a thermal polymerization initiator, a colorant, an antioxidant, a chain transfer agent, an age resistor, a cross-linking accelerator, an ultraviolet absorber, a plasticizer, a preservative, and a dispersant.

Polymerization Inhibitor

Specific examples of the polymerization inhibitor include, but are not limited to, phenol compounds (e.g., hydroquinone, hydroquinone monomethyl ether, 2,6-di-t-butyl-p-cresol, 2,2-methylene-bis-(4-methyl-6-t-butylphenol), 1,1,3-tris-(2-methyl-4-hydroxy-5-t-butylphenyl)butane), sulfur compounds (e.g., dilauryl thiodipropionate), phosphor compounds (e.g., triphenyl phosphite), and amine compounds (e.g., phenothiazine).

The content rate of the polymerization inhibitor in the active energy ray curable liquid composition is typically 5% or less, and preferably from 0.01% to 3%, in view of stability of monomers and polymerization rate.

Minerals Dispersible in Active Energy Ray Curable Liquid Composition

Examples of a mineral dispersible in the active energy ray curable liquid composition include, but are not limited to, layered clay minerals.

Specific examples of the layered clay minerals include, but are not limited to, smectite minerals such as montmorillonite, beidellite, hectorite, saponite, nontronite, and stevensite; vermiculite; bentonite; and layered sodium silicate such as kanemite, kenyaite, and makatite. Both natural layered clay minerals and chemically-synthesized layered clay minerals can be used. Such layered clay minerals having an organic surface treatment can also be used. When layered inorganic matters, including the layered clay minerals, are treated with an organic cationic compound, interlayer cations can be ion-exchanged with cationic groups such as quaternary salts. Examples of the interlayer cations include, but are not limited to, metal cations such as sodium ion and calcium ion. Layered clay minerals treated with an organic cationic compound are easy to swell or disperse in the above-described polymer and polymerizable monomer. Specific examples of such organic-cation-compound-treated layered clay minerals include, but are not limited to, LUCENTITE series (products of Co-op Chemical Co., Ltd.), such as LUCENTITE SPN, LUCENTITE SAN, LUCENTITE SEN, and LUCENTITE STN.

Polymerizable Monomer

Specific examples of the polymerizable monomer include, but are not limited to, acrylates and methacrylates, such as 2-ethylhexyl acrylate (EHA), 2-ethylhexyl methacrylate, isobornyl acrylate, isobornyl methacrylate, 3-methoxybutyl acrylate, 3-methoxybutyl methacrylate, lauryl acrylate, lauryl methacrylate, 2-phenoxyethyl acrylate, 2-phenoxyethyl methacrylate, isodecyl acrylate, isodecyl methacrylate, isooctyl acrylate, isooctyl methacrylate, tridecyl acrylate, tridecyl methacrylate, caprolactone acrylate, caprolactone methacrylate, ethoxylated nonylphenol acrylate, and ethoxylated nonylphenol methacrylate. Each of these materials can be used alone or in combination with others.

Thermal Polymerization Initiator

Examples of the thermal polymerization initiator include, but are not limited to, azo initiators, peroxide initiators, persulfate initiators, and redox initiators. For storage stability, however, photopolymerization initiators are more preferred than thermal polymerization initiators.

Specific examples of the azo initiators include, but are not limited to: VA-044, VA-468, V-50, VA-057, VA-061, VA-067, VA-086, 2,2'-azobis(4-methoxy-2,4-dimethylvaleronitrile) (VAZO 33), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64), 2,2'-azobis-2-methylbutyronitrile (VAZO 67), and 1,1-azobis(1-cyclohexanecarbonitrile) (VAZO 88) (available from Du Pont); and 2,2'-azobis(2-cyclopropylpropionitrile) and 2,2'-azobis(methyl isobutyrate) (V-601) (available from Wako Pure Chemical Industries, Ltd.).

Specific examples of the peroxide initiators include, but are not limited to, benzoyl peroxide, acetyl peroxide, lauroyl peroxide, decanoyl peroxide, dicetyl peroxydicarbonate, di(4-t-butylcyclohexyl) peroxydicarbonate (PERKADOX 16S available from Akzo Nobel N.V.), di(2-ethylhexyl) peroxydicarbonate, t-butyl peroxypivalate (LUPERSOL 11, a product Elf Atochem), t-butyl peroxy-2-ethylhexanoate (TRIGONOX 21-C50 available from Akzo Nobel N.V.), and dicumyl peroxide.

Specific examples of the persulfate initiators include, but are not limited to, potassium persulfate, sodium persulfate, and ammonium persulfate.

Specific examples of the redox initiators include, but are not limited to: a combination of the persulfate initiator with a reducing agent such as sodium metabisulfite and sodium bisulfite; a system based on an organic peroxide and a tertiary amine (e.g., a system based on benzoyl peroxide and dimethylaniline); and a system based on an organic hydroperoxide and a transition metal (e.g., a system based on cumene hydroperoxide and cobalt naphthate).

Colorant

Examples of the colorant include pigments and dyes. Usable pigments include both organic and inorganic pigments.

Specific examples of the organic pigments include, but are not limited to, azo pigments, polycyclic pigments, azine pigments, daylight fluorescent pigments, nitroso pigments, nitro pigments, and natural pigments.

Specific examples of the inorganic pigments include, but are not limited to, metal oxides (e.g., iron oxide, chromium oxide, titanium oxide) and carbon blacks.

Antioxidant

Specific examples of the antioxidant include, but are not limited to, phenol compounds (e.g., monocyclic phenols such as 2,6-di-t-butyl-p-cresol, bisphenols such as 2,2'-methylenebis(4-methyl-6-t-butylphenol), polycyclic phenols such as 1,3,5-trimethyl-2,4,6-tris(3,5-di-t-butyl-4-hydroxybenzyl)benzene), sulfur compounds (e.g., dilauryl 3,3'-thiodipropionate), phosphor compounds (e.g., triphenyl phosphite), and amine compounds (e.g., octylated diphenylamine).

Chain Transfer Agent

Specific examples of the chain transfer agent include, but are not limited to: hydrocarbons (C6-C24 compounds such as aromatic hydrocarbons (e.g., toluene, xylene) and unsaturated aliphatic hydrocarbons (e.g., I-butene, 1-nonene); halogenated hydrocarbons (C1-C24 compounds such as dichloromethane and carbon tetrachloride); alcohols (C1-C24 compounds such as methanol and 1-butanol); thiols (C1-C24 compounds such as ethyl thiol and 1-octyl thiol); ketones (C3-C24 compounds such as acetone and methyl ethyl ketone); aldehydes (C2-C18 compounds such as 2-methyl-2-propylaldehyde and 1-pentylaldehyde); phenols (C6-C36 compounds such as phenol and m-, p-, or o-cresol); quinones (C6-C24 compounds such as hydroquinone); amines (C3-C24 compounds such as diethylmethylamine and diphenylamine); and disulfides (C2-C24 compounds such as diethyl disulfide and di-1-octyl disulfide).

Hydrogel Body

In the present disclosure, a hydrogel body refers to an object formed by laminating a hydrogel, and a hydrogel precursor refers to a material that forms (becomes) the hydrogel.

Specific examples of the hydrogel include, but are not limited to, topological gel, double network gel, tetra PEG gel, and nanocomposite gel. In particular, active energy ray curable double network gels and nanocomposite gels are preferable.

Strength of Cured Product of Active Energy Ray Curable Liquid Composition

In the present disclosure, "strength" of a cured product of the active energy ray curable liquid composition (i.e., the support structure) indicates the performance of the support structure for supporting a molded part during creation. The strength is represented by a compression stress exhibited when the support structure is compressed such that the strain becomes 1%. In view of molding accuracy of the object to be created and solubility of the support structure, the support structure is a solid that exhibits a compression stress of 0.5 kPa or more, preferably from 2 to 1,000 kPa, and more preferably from 2 to 300 kPa, when being compressed such that the strain becomes 1% at 25° C. The strength of the support structure can be adjusted to the above preferred range by properly selecting the types and contents of the monomer (A) and the solvent (C). The compression stress can be measured by a universal tester (AG-I available from Shimadzu Corporation).

The strength of the support structure is increased as straight alkyl chains get more oriented.

Removability of Support Structure

The strength of the support structure originates from the orientation of straight alkyl chains, as described above. As the oriented straight alkyl chains are heated, the orientation collapses and the support is liquefied, making it easier to remove the support structure. When the support structure becomes a liquid exhibiting a viscosity of 1,000 mPa·s or less at 60° C., it becomes much easier to remove the support structure. For example, the support structure can be removed by dipping in hot water having a temperature of about 60° C. In a case in which the support structure slightly remains on the molded part, ultrasonic waves may be applied during the dipping.

Method for Manufacturing Three-Dimensional Objects

In the method for manufacturing three-dimensional objects according to an embodiment of the present disclosure, the active energy ray curable liquid composition according to an embodiment of the present disclosure is used.

Specifically, the method preferably includes the processes of laminating a cured product of the active energy ray curable liquid composition to create a support structure, creating a three-dimensional object with the support of the support structure, and heating the support structure to remove the support structure from the three-dimensional object.

More specifically, the method preferably includes the processes of forming a liquid film of the active energy ray curable liquid composition and curing the liquid film. Preferably, the process of forming the liquid film is performed by an inkjet method or a dispenser.

Apparatus for Manufacturing Three-Dimensional Objects

The apparatus for manufacturing three-dimensional objects according to an embodiment of the present disclosure includes a liquid film forming device to form a liquid film of the active energy ray curable liquid composition while controlling the application position and application amount thereof and a curing device to cure the liquid film.

Preferably, the liquid film forming device is an inkjet device. More preferably, the liquid film forming device is a heater-less device capable of forming liquid films at room temperature.

Example Method for Manufacturing Three-Dimensional Objects

One example method for manufacturing three-dimensional objects using the active energy ray curable liquid composition according to an embodiment of the present disclosure, employing an inkjet process, is described below with reference to FIG. 1.

First, surface data or solid data of a three-dimensional shape, designed by a three-dimensional CAD (computer-aided design) system or incorporated by a three-dimensional scanner or digitizer, is converted into STL format and input into an additive manufacturing apparatus.

Next, the direction of creation of an object having the three-dimensional shape is determined based on the input data. The direction of creation is generally determined such that the dimension of the resulting object in the Z direction (height direction) becomes shortest, but is not limited thereto.

After determination of the direction of creation, projected areas of the three-dimensional shape on X-Y plane, X-Z plane, and Y-Z plane are determined. The block shape defined by the three planes (X-Y plane, X-Z plane, and Y-Z plane) is sliced into layers having a constant thickness in the Z direction. The thickness of one layer generally ranges from 20 to 60 μm, depending on the material in use. In a case in which only one object is to be created, the block shape is arranged at the center on a Z stage that supports the object during creation. The Z stage descends a distance corresponding to the thickness of each layer after each layer is created. In a case in which multiple objects are to be created at once, multiple block shapes are arranged on the Z stage. The multiple block shapes may be stacked in layers. It is possible that the creation of the block shape and slice data (contour data) and arrangement thereof on the Z stage are automatically performed as the material in use is specified.

Next, a molding process is performed as follows. Heads 1 and 2 are moved in both directions while ejecting a molding material a and an active energy ray curable liquid composition β, respectively, to form dots thereof. Continuous dots thus formed become a liquid film at a desired position. The liquid film is irradiated with ultraviolet rays to cure, thus forming a molding material film and a support material film at desired positions.

Figure 2:
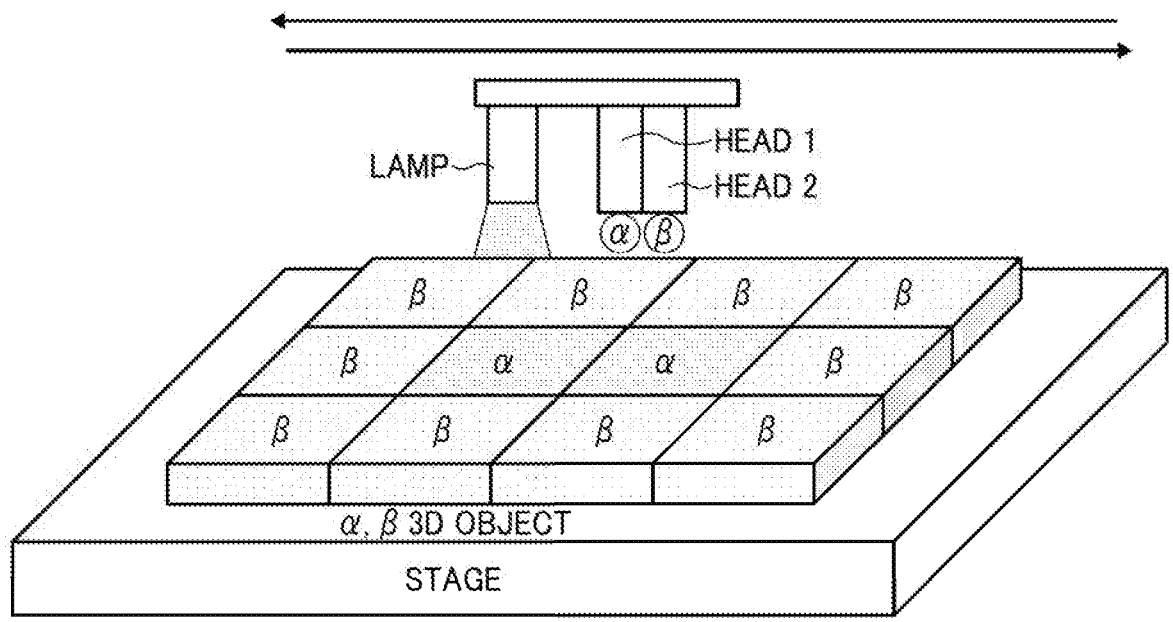
FIG. 2 is a schematic view illustrating a three-dimensional object obtained by laminating layers each formed from the liquid film illustrated in FIG. 1.

After one layer of the molding material film and the support material film has been formed, the stage descends a distance corresponding to the thickness of the layer. Continuous dots are formed again on the molding material film and the support material film to become another liquid film at a desired position. The liquid film is irradiated with ultraviolet rays to cure, thus forming another molding material film and another support material film at the desired position. This operation is repeated to laminate multiple layers to create a three-dimensional object, as illustrated in FIG. 2.

The three-dimensional object thus formed includes the support structure and the molded part. The molded part can be isolated by removing the support part by application of heat.

EXAMPLES

Further understanding can be obtained by reference to certain specific examples which are provided herein for the purpose of illustration only and are not intended to be limiting.

Examples 1-5 and Comparative Examples 1-3

Preparation of Active Energy Ray Curable Liquid Compositions

Active energy ray curable liquid compositions 1 to 8 were each prepared by blending constituents described in Table 1. The active energy ray curable liquid compositions 1 to 5 were used in Examples 1 to 5, respectively. The active energy ray curable liquid compositions 6 to 8 were used in Comparative Examples 1 to 3, respectively.

Symbols presented in Table 1 denote the following materials.

A-1: Dodecyl acrylate (available from Tokyo Chemical industry Co., Ltd.)

A-2: Stearyl acrylate (available from Tokyo Chemical Industry Co., Ltd.)

A-3: Docosyl acrylate (available from Tokyo Chemical Industry Co., Ltd.)

A-4: Vinyl stearate (available from Tokyo Chemical Industry Co., Ltd.)

B: 1-Hydroxycyclohexyl phenyl ketone (Product name: IRGACURE 184 available from BASF)

C-1: 1-Dodecanol (available from Tokyo Chemical Industry Co., Ltd.)

C-2: Octyl acetate (available from Tokyo Chemical Industry Co., Ltd.)

Creation of Support Structure

A silicone rubber block having a longitudinal length of 20 mm, a lateral width of 20 mm, and a height of 5 mm was processed such that a hole having a diameter of 5 mm was formed penetrating the central part thereof in the height direction. The silicone rubber block was put on a glass plate with the hole facing upward. Each active energy ray curable liquid composition 1 to 6 was poured in the hole and irradiated with 500 mJ/cm$^2$ of ultraviolet rays emitted from an ultraviolet emitter. Thus, support structures 1 to 6 were prepared.

Since the active energy ray curable liquid compositions 7 and 8 were in a solid state at 25° C., no support structure was created therefrom.

Evaluations (1) Viscosity of Active Energy Ray Curable Liquid Composition at 25° C.

Each active energy ray curable liquid composition 1 to 6 was subjected to a measurement of viscosity at 25° C. using a rotary viscometer (e.g., VISCOMATE VM-150111 available from Toki Sangyo Co., Ltd.).

Neither of the active energy ray curable liquid compositions 7 and 8 was subjected to the measurement of viscosity because they were in a solid state at 25° C.

(2) Viscosity of Support Structure at 60° C.

Each support structure 1 to 6 was heated to 60° C. to become a liquid, and the liquid was subjected to a measurement of viscosity at 60° C. using a rotary viscometer (e.g., VISCOMATE VM-150111 available from Toki Sangyo Co., Ltd.).

(3) Occurrence or Non-Occurrence of State Change from Solid to Liquid at 60° C.

Each support structure 1 to 6 in an amount of 2 g was put in a thermostatic chamber at 60° C. and visually observed to determine whether the support structure had changed from the solid state to the liquid state. Occurrence and non-occurrence of the state change are mentioned as "Yes" and "No", respectively, in Table 1.

(4) Removability of Support Structure

Each support structure 1 to 6 was put in hot water having a temperature of 60° C., along with the silicone rubber block, and ultrasonic waves were applied thereto by an ultrasonic cleaner (ASU-6 available from AS ONE Corporation) for 30 minutes. Thus, the support structure was removed.

The silicone rubber block was taken out of hot water and removability of the support structure was evaluated based on the following criteria.

Evaluation Criteria

A: Sufficient removal of the support structure. (The hole was completely penetrated.)
B: Insufficient removal of the support structure. (The hole was partially penetrated.)
C: Defective removal of the support structure. (The hole was clogged with the swollen cured product.)

(5) Strength of Support Structure

In a 25° C. environment, each support structure molded into a block with sides having lengths of 20 mm, 20 mm, and 5 mm was set in a universal tester (AG-I available from Shimadzu Corporation) equipped with 1 kN load cell and a 1 kN compression jig. The compression stress applied to the load cell was recorded by a computer and the relation between the stress and deformation amount was plotted. The strength was evaluated based on the compression stress exhibited when the support structure was compressed such that the strain becomes 1%.

Evaluation Criteria

A+: 10 kPa or greater but less than 300 kPa (The strength of the support structure is sufficient.)
A: 2 kPa or greater but less than 10 kPa (The strength of the support structure is average.)
C: less than 2 kPa (The strength of the support structure is insufficient.)

The results for the above evaluations (1) to (5) are presented in Table 1.

TABLE 1

|  |  |  | Examples |  |  |  |  | Comparative Examples |  |  |
|---|---|---|---|---|---|---|---|---|---|---|
|  |  |  | 1 | 2 | 3 | 4 | 5 | 1 | 2 | 3 |
|  | Active Energy Ray Curable Liquid Composition No. |  | 1 | 2 | 3 | 4 | 5 | 6 | 7 | 8 |
|  | Support Structure No. |  | 1 | 2 | 3 | 4 | 5 | 6 | — | — |
| Blending Amount (Parts by mass) | Monomer (A) | A-1 | 29 |  |  |  |  | 49 |  |  |
|  |  | A-2 | 29 | 15 | 49 | 78 |  |  | 8 | 88 |
|  |  | A-3 |  |  |  |  | 15 |  |  |  |
|  |  | A-4 |  |  |  |  |  |  |  |  |
|  | Photopolymerization Initiator (B) | B | 2 | 2 | 2 | 2 | 2 | 2 | 2 | 2 |
|  | Solvent (C) | C-1 | 40 | 83 | 49 | 20 |  | 49 | 90 | 10 |
|  |  | C-2 |  |  |  |  | 83 |  |  |  |
| Evaluations | (1) Viscosity of Active Energy Ray Curable Liquid Composition at 25° C. |  | 12.1 | 12.2 | 12.5 | 12.7 | 11.3 | 8.3 | — | — |
|  | (2) Viscosity of Support Structure at 60° C. |  | 10.8 | 11.1 | 11.1 | 11.3 | 10.6 | 5.6 | — | — |
|  | (3) Occurrence or Non-occurrence of State Change from Solid to Liquid at 60° C. |  | Yes | Yes | Yes | Yes | Yes | Yes | — | — |
|  | (4) Removability of Support Structure |  | A | A | A | A | A | A | — | — |
|  | (5) Strength of Support Structure |  | A+ | A | A+ | A+ | A | C | — | — |

Evaluation Results

In Examples 1 to 5, each support structure was changed from the solid state to the liquid state at 60° C. and easily removed. Thus, in Examples 1 to 5, each support structure was evaluated as having good removability. In Examples 1, 3, and 4, the strength of each support structure was evaluated to be sufficient. These support structures can sufficiently support a molding material even in a large volume, which has been difficult for a conventional support structure to support.

In Comparative Example 1, dodecyl acrylate, having a side chain including 12 carbon atoms, was used as the monomer (A). Due to an orientation of the side chains, the crystallinity was lowered, and therefore the strength of the support structure was insufficient.

In Comparative Example 2, the active energy ray curable liquid composition was in a solid state at 25° C. because the amount of 1-dodecanol was large.

In Comparative Example 3, the active energy ray curable liquid composition was in a solid state at 25° C. because the amount of stearyl acrylate was large.

Example 6

A three-dimensional object was created from the active energy ray curable liquid composition 3 used in Example 3 by an inkjet process.

As a molding material, the hydrogel precursor prepared below (as disclosed in JP-2015-136895-A) was used.

Preparation of Hydrogel Precursor

An initiator solution was prepared by dissolving 2 parts by mass of a photopolymerization initiator (IRGACURE 184 available from BASF) in 98 parts by mass of methanol.

Next, 8 parts by mass of a synthetic hectorite, serving as a water-swelling layered clay mineral, represented by a compositional formula $[Mg_{5.34}Li_{0.66}Si_8O_{20}(OH)_4]Na_{0.66}$ (LAPONITE LXG, product of Rockwood) was gradually added to 195 parts by mass of pure water being stirred. Next, 20 parts by mass of N,N-dimethylacrylamide (available from Wako Pure Chemical Industries, Ltd.), which had been passed through activated alumina column so that the polymerization inhibitor was removed therefrom, was added to the liquid dispersion as a polymerizable monomer. Furthermore, 0.2 parts by mass of sodium dodecyl sulfate (available from Wako Pure Chemical Industries, Ltd.) was added to the liquid dispersion as a surfactant.

Next, 0.5 parts of the initiator solution was added to the liquid dispersion being cooled in an ice bath and stir-mixed therein, followed by a degassing under reduced pressures for 10 minutes. The resulting liquid was subjected to filtration to remove impurities. Thus, a homogeneous hydrogel precursor was prepared.

Figure 3:
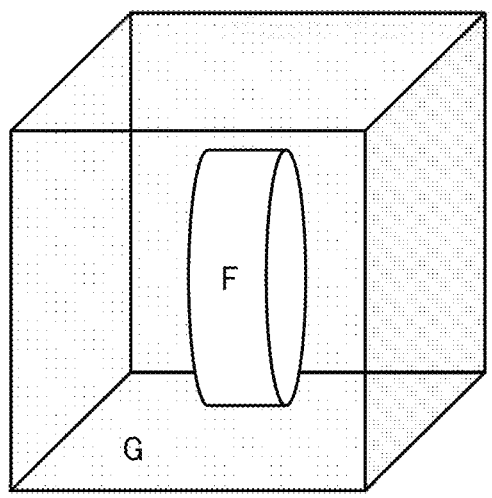
FIG. 3 is a schematic view illustrating a support structure formed from an active energy ray curable liquid composition according to an embodiment of the present disclosure.

After filling the heads 1 and 2 illustrated in FIG. 1 with the hydrogel precursor prepared above and the active energy ray curable liquid composition 3 used in Example 3, respectively, a three-dimensional object was created as illustrated in FIG. 3 by the method described in the above "Example Method for Manufacturing Three-dimensional Objects" section. In FIGS. 3, F and G denote the molded part formed from the hydrogel precursor and the support structure formed from the active energy ray curable liquid composition 3, respectively. The support structure in a cubic shape supports the molded part (hydrogel) in a cylindrical shape while forming an interface therebetween. Separability and moldability of the support structure were excellent. The three-dimensional object thus obtained was left to stand still in a thermostatic chamber at 60° C. for 10 minutes. As a result, the support structure was liquefied and the molded part was isolated in an easy manner. A part of the support structure slightly remaining on the molded part was removed in hot water having a temperature of 60° C. by application of ultrasonic waves by an ultrasonic cleaner (ASU-6 available from AS ONE Corporation) for 5 minutes. The support structure had been completely removed without roughening the contact surface of the molded part with the support structure.

Example 7

The procedure in Example 6 was repeated except for replacing the active energy ray curable liquid composition 3 (prepared from 49 parts by mass of stearyl acrylate (A-2) in Example 3) with another active energy ray curable liquid composition 9 (prepared from 49 parts by mass of vinyl stearate (A-4)).

As a result of replacement of stearyl acrylate (A-2) with vinyl stearate (A-4), the curing rate of the support material (active energy ray curable liquid composition) was so lowered that the molded part could not be sufficiently supported during creation. Although the resulted support structure exhibited sufficient strength, it took too long a time to complete curing. It is considered that the strength of the support structure was insufficient during the creation, so that the molded part could not be sufficiently supported during creation.

Example 8

A three-dimensional object was created from the active energy ray curable liquid composition 3 used in Example 3 by an inkjet process.

As a molding material, the molding material precursor prepared below (as disclosed in JP-2012-111226-A) was used.

Preparation of Molding Material Precursor

In a reaction vessel, 100 parts by mass of a caprolactone adduct of 2-hydroxyethyl acrylate (PLACCEL FA-4D available from Daicel Corporation, having an addition molar number of 4), 64 parts by mass of a cycloaliphatic polyisocyanate based on isophorone diisocyanate (VESTANAT T1890 available from Evonik Japan Co., Ltd.), and 0.03 parts by mass of bismuth tri(2-ethylhexanoate) (in 50% solution of 2-ethylhexane), serving as an urethane-forming catalyst, were subjected to a reaction at 80° C.: for 12 hours, thus obtaining an urethane acrylate.

In a beaker, 20 parts by mass of the urethane acrylate, 70 parts by mass of isobornyl acrylate (available from Kyoeisha Chemical Co., Ltd.), 10 parts by mass of dicyclopentanedimethylol diacrylate (available from Kyoeisha Chemical Co., Ltd.), 5 parts by mass of 1,3,5-trimethylbenzoyldiphenylphosphine oxide (available from BASF), 0.05 parts by mass of carbon black (MHI BLACK #220 available from MIKUNI COLOR LTD.) were uniformly mixed, thus obtaining a molding material precursor.

Figure 4:
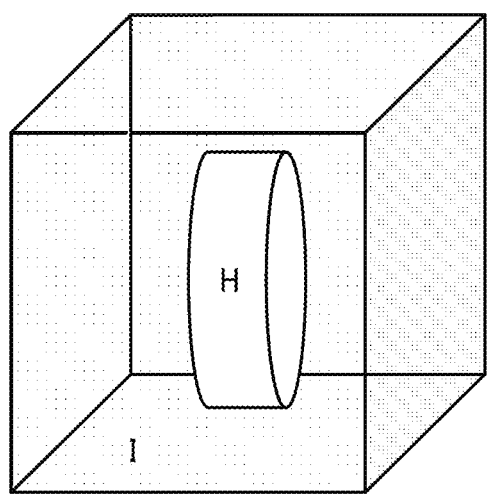
FIG. 4 is a schematic view illustrating a support structure formed from an active energy ray curable liquid composition according to an embodiment of the present disclosure.

After filling the heads 1 and 2 illustrated in FIG. 1 with the molding material precursor prepared above and the active energy ray curable liquid composition 3 used in Example 3, respectively, a three-dimensional object was created as illustrated in FIG. 4 in the same manner as above Examples. In FIGS. 4, H and I denote the molded part formed from the molding material precursor and the support structure formed from the active energy ray curable liquid composition 3, respectively. The support structure in a cubic shape supports the molded part in a cylindrical shape while forming an interface therebetween. Separability and moldability of the support structure were excellent. The three-dimensional object thus obtained was left to stand still in a thermostatic chamber at 60° C. for 10 minutes. As a result, the support structure was liquefied and the molded part was isolated in an easy manner. A part of the support structure slightly remaining on the molded part was removed in hot water having a temperature of 60° C. by application of ultrasonic waves by an ultrasonic cleaner (ASU-6 available from AS ONE Corporation) for 5 minutes. The support structure had been completely removed without roughening the contact surface of the molded part with the support structure.

TABLE 2

|  |  |  | Examples | | |
|---|---|---|---|---|---|
|  |  |  | 6 | 7 | 8 |
| Active Energy Ray Curable Liquid Composition No. | | | 3 | 9 | 3 |
| Blending Amount (Parts by mass) | Monomer (A) | A-1 | | | |
| | | A-2 | 49 | | 49 |
| | | A-3 | | | |
| | | A-4 | | 49 | |
| | Photopolymerization Initiator (B) | B | 2 | 2 | 2 |
| | Solvent (C) | C-1 | 49 | 49 | 49 |
| | | C-2 | | | |
| Evaluations | (3) Occurrence or Non-occurrence of State Change from Solid to Liquid at 60° C. | | Yes | Yes | Yes |
| | (4) Removability of Support Structure | | A | A | A |
| | (5) Strength of Support Structure | | A+ | A+ | A+ |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An active energy ray curable liquid composition, comprising:
    at least one monomer (A) selected from the group consisting of stearyl acrylate, docosyl acrylate, stearyl methacrylate, docosyl methacrylate, palmityl acrylamide, stearyl acrylamide, vinyl stearate, and vinyl docosanoate;
    a polymerization initiator (B); and
    a solvent (C) capable of dissolving the monomer (A),
    wherein a cured product of the active energy ray curable liquid composition is a solid at 25° C. and a liquid at 60° C.

2. The active energy ray curable liquid composition of claim 1, wherein, when the cured product is obtained by irradiating the active energy ray curable liquid composition with 500 mJ/cm$^2$ of ultraviolet ray, the solid exhibits a compression stress of 0.5 kPa or more when being compressed at a strain of 1% at 25° C.

3. The active energy ray curable liquid composition of claim 1, wherein, when the cured product is obtained by irradiating the active energy ray curable liquid composition with 500 mJ/cm$^2$ of ultraviolet ray, the liquid exhibits a viscosity of 5,000 mPa·s or less at 60° C.

4. An active energy ray curable liquid composition, comprising
    at least one monomer (A) selected from the group consisting of stearyl acrylate, docosyl acrylate, stearyl methacrylate, docosyl methacrylate, palmityl acrylamide, stearyl acrylamide, vinyl stearate, and vinyl docosanoate;
    a polymerization initiator (B); and
    a solvent (C) capable of dissolving the monomer (A),
    wherein
    the active energy ray curable liquid composition exhibits a viscosity of 300 mPa·s or less at 25° C., and
    a cured product of the active energy ray curable liquid composition is a solid exhibiting a compression stress of 0.5 kPa or more when being compressed at a strain of 1% at 25° C. and a liquid exhibiting a viscosity of 5,000 mPa·s or less at 60° C.

5. The active energy ray curable liquid composition of claim 1, wherein the monomer (A), the polymerization initiator (B), and the solvent (C) account for 20% to 70% by mass, 0.5% to 10% by mass, 20% to 70% by mass, respectively, of the active energy ray curable liquid composition.

6. The active energy ray curable liquid composition of claim 1, wherein the solvent (C) includes a compound having a straight chain including 6 or more carbon atoms.

7. A method for manufacturing three-dimensional objects, comprising:
    laminating a cured product of the active energy ray curable liquid composition of claim 1.

8. A method for manufacturing three-dimensional objects, comprising:
    creating a support structure by laminating a cured product of the active energy ray curable liquid composition of claim 1, and
    removing the support structure by application of heat.

9. The method of claim 8, further comprising:
    creating a three-dimensional object by laminating a hydrogel.

10. An apparatus for manufacturing three-dimensional objects, comprising:
    a container storing the active energy ray curable liquid composition of claim 1;
    an ejection device to eject the active energy ray curable liquid composition; and
    a curing device to cure the active energy ray curable liquid composition ejected by the ejection device.

11. The active energy ray curable liquid composition of claim 1, wherein the solvent (C) is at least one selected from the group consisting of hexyl acetate, octyl acetate, hexanol, decanol, and dodecanol.

12. The active energy ray curable liquid composition of claim 4, wherein the solvent (C) is at least one selected from the group consisting of hexyl acetate, octyl acetate, hexanol, decanol, and dodecanol.

* * * * *